(12) United States Patent
Liu et al.

(10) Patent No.: US 10,329,468 B2
(45) Date of Patent: Jun. 25, 2019

(54) THERMALLY CONDUCTIVE RESIN AND THERMAL INTERFACE MATERIAL COMPRISING THE SAME

(71) Applicant: INDUSTRIAL TECHNOLOGY RESEARCH INSTITUTE, Hsinchu (TW)

(72) Inventors: Yen-Chun Liu, Taipei (TW); Hui-Wen Chang, Hsinchu (TW); Min-Chian Wang, New Taipei (TW); Kuo-Chan Chiou, Tainan (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 152 days.

(21) Appl. No.: 15/046,973

(22) Filed: Feb. 18, 2016

(65) Prior Publication Data

US 2017/0158934 A1    Jun. 8, 2017

(30) Foreign Application Priority Data

Dec. 7, 2015    (TW) .............................. 104140917 A

(51) Int. Cl.
*C09K 5/14* (2006.01)
*C08G 73/10* (2006.01)
(Continued)

(52) U.S. Cl.
CPC ................ *C09K 5/14* (2013.01); *C08G 73/10* (2013.01); *C08G 73/1035* (2013.01);
(Continued)

(58) Field of Classification Search
CPC ....... C09K 5/14; C08L 79/08; C08G 73/1035; C08G 73/1046; C08G 73/10; C08G 73/14
See application file for complete search history.

(56) References Cited

U.S. PATENT DOCUMENTS 2,997,391 A    8/1961 Murray et al.
8,001,277 B2    12/1999 Ichimura et al.
(Continued)

FOREIGN PATENT DOCUMENTS

CN    102690597 A    9/2012
CN    102838928 A    12/2012
(Continued)

OTHER PUBLICATIONS

Kurita et al., machine English translation of JP 07-070276 (dated Mar. 1995).*
(Continued)

*Primary Examiner* — Jessica M Roswell
(74) *Attorney, Agent, or Firm* — Birch, Stewart, Kolasch & Birch, LLP

(57) ABSTRACT

A thermally conductive resin is provided. The thermally conductive resin has the formula

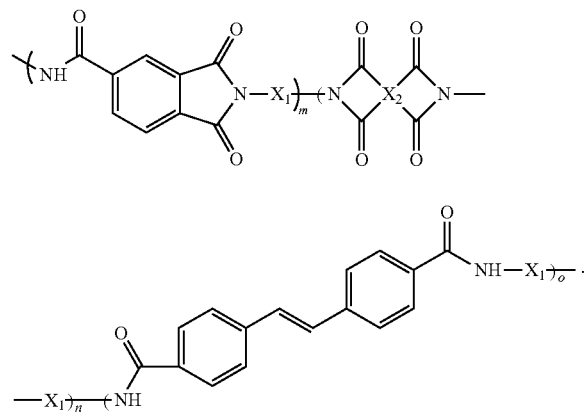

In the formula, $X_1$ is

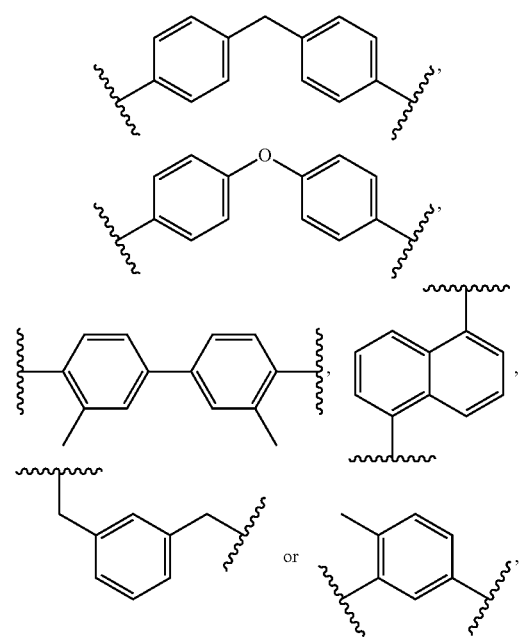

$X_2$ is
(Continued)

US 10,329,468 B2
Page 2

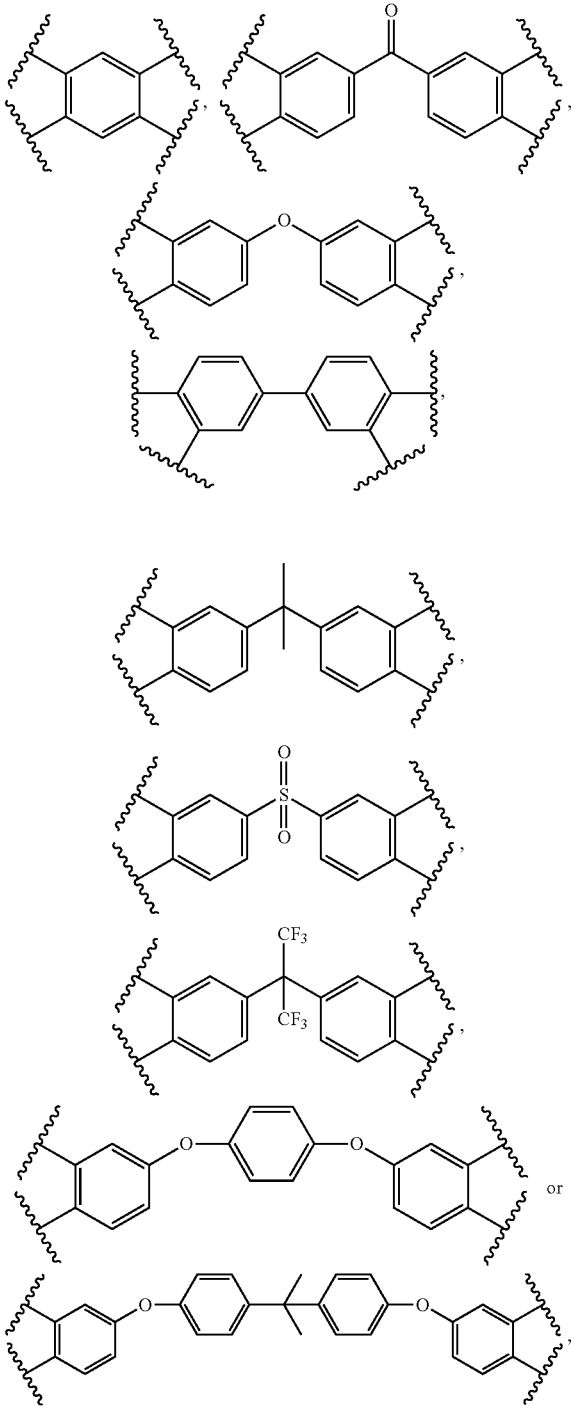

m is an integer ranging from 0 to 95, n is an integer ranging from 1 to 50, and o is an integer ranging from 1 to 80. A thermal interface material including the thermally conductive resin is also provided.

6 Claims, No Drawings

(51) Int. Cl.
    *C08L 79/08*     (2006.01)
    *C08G 73/14*     (2006.01)
    *C08K 3/34*     (2006.01)
    *C08K 3/22*     (2006.01)
    *C08K 3/28*     (2006.01)
    *C08K 3/38*     (2006.01)

(52) U.S. Cl.
    CPC ......... *C08G 73/1046* (2013.01); *C08G 73/14* (2013.01); *C08L 79/08* (2013.01); *C08K 3/34* (2013.01); *C08K 2003/2227* (2013.01); *C08K 2003/282* (2013.01); *C08K 2003/382* (2013.01)

(56) References Cited

U.S. PATENT DOCUMENTS

| | | | |
|---|---|---|---|
| 6,685,855 B1 * | 2/2004 | Miller | B29C 45/0013 264/1.1 |
| 7,189,439 B2 | 3/2007 | Tomioka et al. | |
| 8,222,365 B2 | 7/2012 | Shimeno et al. | |
| 8,546,511 B2 | 10/2013 | Tai et al. | |
| 9,371,233 B2 * | 6/2016 | Lin | C08G 73/14 |
| 2012/0244351 A1 | 9/2012 | Katagi et al. | |
| 2013/0020117 A1 | 1/2013 | Yamato | |
| 2015/0025188 A1 | 1/2015 | Yoshihara et al. | |
| 2015/0206627 A1 | 7/2015 | Amano et al. | |

FOREIGN PATENT DOCUMENTS

| | | |
|---|---|---|
| CN | 104710617 A | 6/2015 |
| JP | 2-298514 A | 12/1990 |
| JP | 7-70276 A | 3/1995 |
| JP | 7-508772 A | 9/1995 |
| JP | 8-165347 A | 6/1996 |
| JP | 11-271529 A | 10/1999 |
| JP | 2010-538111 A | 12/2010 |
| TW | 201524901 A | 7/2015 |

OTHER PUBLICATIONS

European Search Report for Appl. No. 16190975.9 dated May 4, 2017.
Hwan Kyu Kim et al., "Second-order NLO polyamideimides based on functionalized stilbene derivatives: direct polycondensation and characterization", Elsevier, Polymer, 1998 vol. 39, Nos. 8-9, pp. 1719-1726.
J.H. Park et al., "Synthesis and Characterization of Novel Poiyimides Bearing a Side Chain Composed of Stilbene Mesogen and Undecyl Spacer and the Alignment Ability of Nematic Liquid-Crystal Molecules", Journal of Polymer Science: Part A: Polymer Chemistry, 2001 vol. 39, pp. 1800-1809.
Suk Gyu Hahm et al., "UV-Driven Switching of Chain Orientation and Liquid Crystal Alignment in Nanoscale Thin Films of a Novel Polyimide Bearing Stilbene Moieties-in the Backbone", The Journal of Physical Chemistry B, 2008, 112, pp. 4900-4912.
Zhonghua Peng et al., "Second-Order Nonlinear Opiical Polyimide with High-Temperature Stability", Macromolecules, 1994, 27, pp. 2638-2640.
Taiwanese Office Action and Search Report for Taiwanese Application No. 104140917, dated Apr. 11, 2016.
Japanese Office Action dated Sep. 19, 2017 for JP Application No. 2016-237851 and English Translation.
Chinese Office Action and Search Report for Chinese Application No. 201610031432.8, dated Aug. 15, 2018.

* cited by examiner

THERMALLY CONDUCTIVE RESIN AND THERMAL INTERFACE MATERIAL COMPRISING THE SAME

CROSS REFERENCE TO RELATED APPLICATIONS

This Application claims the priority of Taiwan Patent Application No. 104140917, filed on Dec. 7, 2015, the entirety of which is incorporated by reference herein.

TECHNICAL FIELD

The technical field relates to thermally conductive resin and thermal interface material.

BACKGROUND

In order to improve the development of electronic products with multi-functionality, high-speed and high-power, a thermal interface material plays a key role in thermal management design. How to increase thermal conductivity efficiency between elements and heat sinks, the characteristics of thermal conductivity and thermal resistance of the thermal interface material play an important role.

The resin composition of the current thermal interface material is mostly epoxy resin, siloxane resin, polyamideimide resin and polyimide resin, and high-thermal-conductive powder capable of improving thermal conductivity, for example ceramic powder such as aluminum oxide or boron nitride is added thereto, and then made into the form of flakes, gaskets, ribbon, or film. In order to improve the thermal conductivity value of the thermal interface material, the amount of thermally conductive powder that is added is usually greater than 80 wt % based on the total composition. As more thermally conductive powder is added, the thermal conductivity value gets higher. However, in this situation, it is often difficult to exhibit other characteristics of the resin composition, resulting in deteriorated characteristics such as inadequate electrical insulation, softness, mechanical strength or heat resistance of the thermal interface material, substantially restricting its use.

Accordingly, there is a need for a novel high-thermal-conductive resin which can be conducted with less inorganic thermally conductive powder to meet the requirements of high thermal conductivity and high dielectric insulation.

SUMMARY

One embodiment of the disclosure provides a thermally conductive resin, represented by formula (I):

In formula (I), $X_1$ is

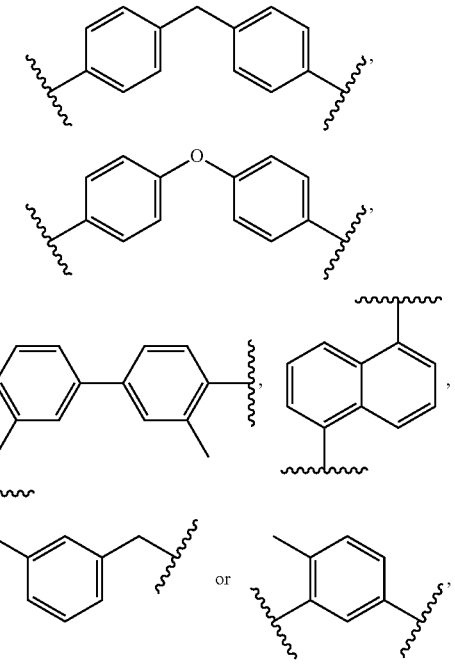

$X_2$ is

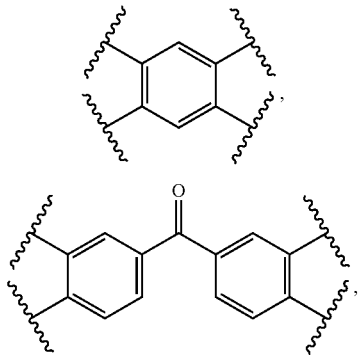

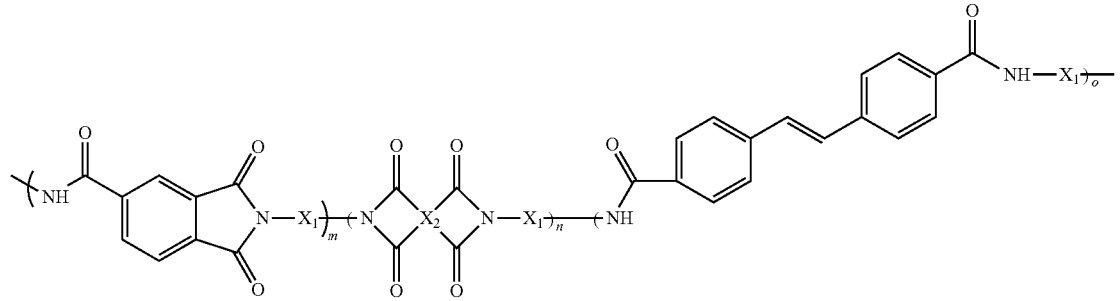

(I)

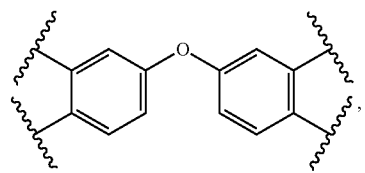,

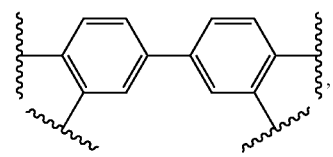,

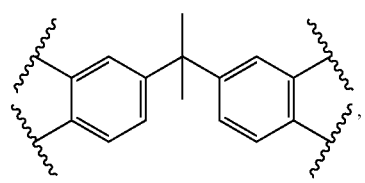,

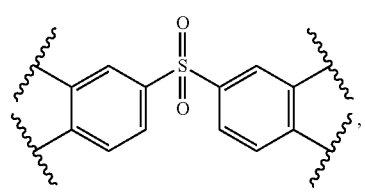,

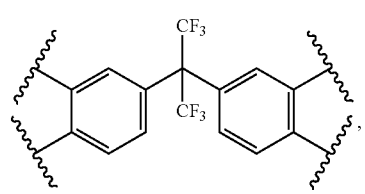,

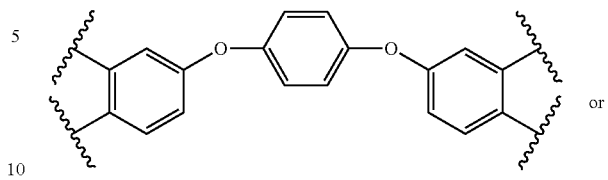 or

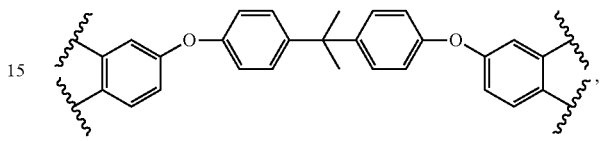, m is an integer ranging from 0 to 95, n is an integer ranging from 1 to 50, and o is an integer ranging from 1 to 80.

One embodiment of the disclosure provides a thermal interface material comprising the disclosed thermally conductive resin.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a thermally conductive resin, represented by formula (I):

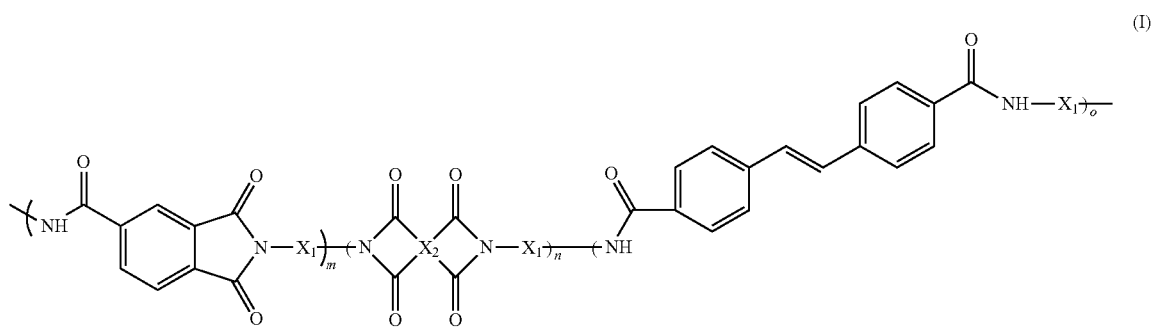

In formula (I), X₁ may be

[chemical structure: diphenylmethane linker]

[chemical structure: diphenyl ether linker]

[chemical structure: dimethylbiphenyl linker]

[chemical structure: naphthalene linker], [chemical structure: meta-xylylene linker] or

[chemical structure: methylphenylene linker].

X₂ may be

[chemical structure: phenylene linker], [chemical structure: benzophenone linker],

[chemical structure: diphenyl ether linker],

[chemical structure: biphenyl linker],

[chemical structure: isopropylidene diphenyl linker],

[chemical structure: sulfonyl diphenyl linker],

[chemical structure: hexafluoroisopropylidene diphenyl linker],

[chemical structure: bis(phenoxy)phenyl linker] or

[chemical structure: bis(phenoxy)isopropylidene diphenyl linker].

Additionally, in formula (I), m may be an integer ranging from about 0 to 95, n may be an integer ranging from about 1 to 50, and o may be an integer ranging from about 1 to 80.

In some embodiments, in formula (I), m may be an integer ranging from about 0 to 75, n may be an integer ranging from about 5 to 50, and o may be an integer ranging from about 20 to 80.

In some embodiments, in formula (I), m may be 0, n may be an integer ranging from about 20 to 50, and o may be an integer ranging from about 50 to 80.

In some embodiments, in formula (I), m may be an integer ranging from about 5 to 75, n may be an integer ranging from about 5 to 30, and o may be an integer ranging from about 20 to 80.

One embodiment of the disclosure provides a thermal interface material comprising a thermally conductive resin.

In some embodiments, the thermally conductive resin may be represented by formula (I):

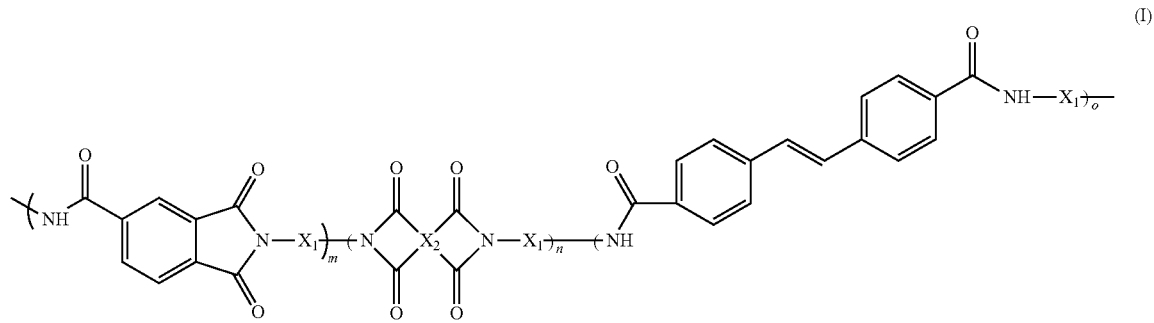
In formula (I), $X_1$ may be
$X_2$ may be
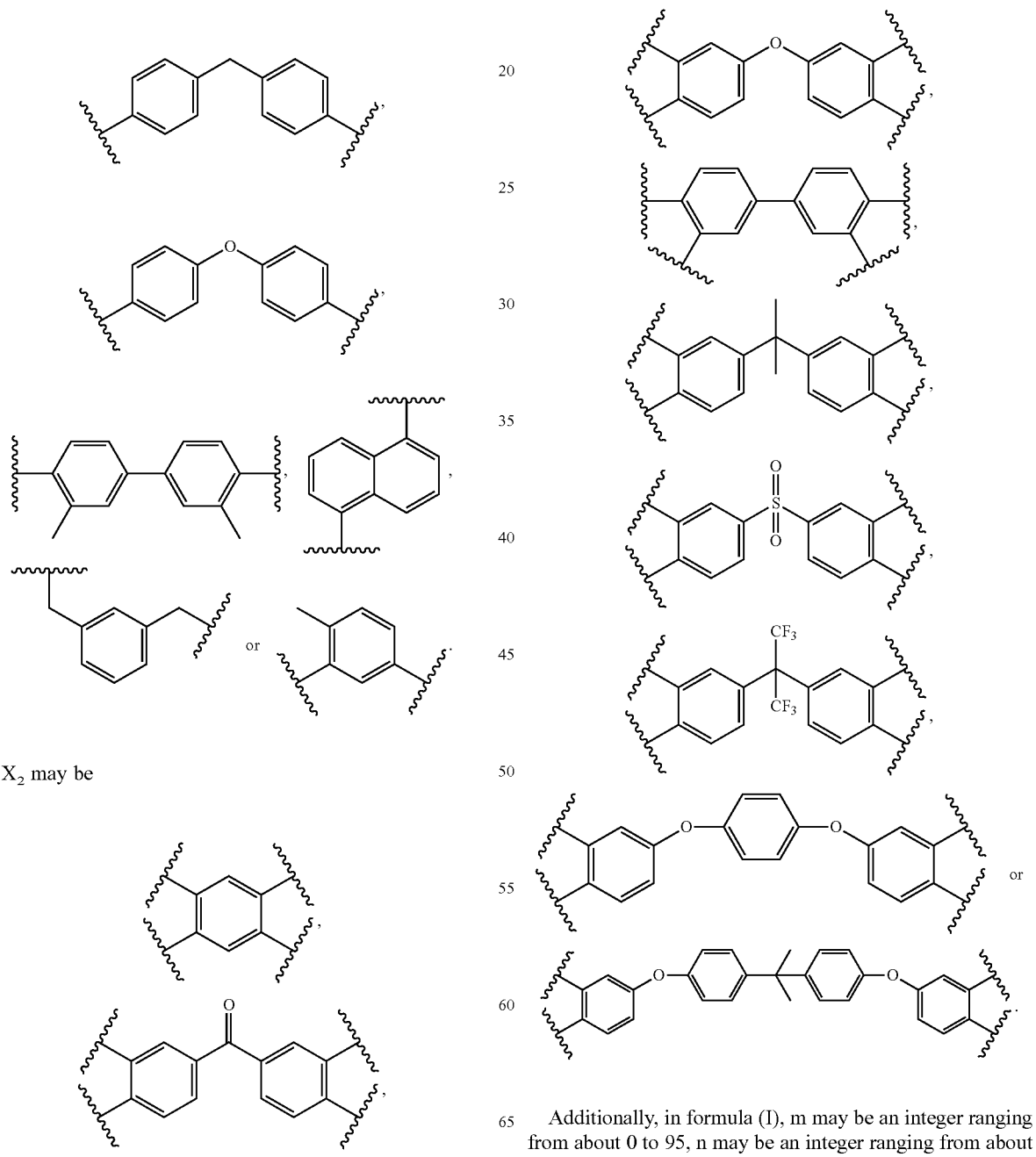
Additionally, in formula (I), m may be an integer ranging from about 0 to 95, n may be an integer ranging from about 1 to 50, and o may be an integer ranging from about 1 to 80.

In some embodiments, in formula (I), m may be an integer ranging from about 0 to 75, n may be an integer ranging from about 5 to 50, and o may be an integer ranging from about 20 to 80.

In some embodiments, in formula (I), m may be 0, n may be an integer ranging from about 20 to 50, and o may be an integer ranging from about 50 to 80.

In some embodiments, in formula (I), m may be an integer ranging from about 5 to 75, n may be an integer ranging from about 5 to 30, and o may be an integer ranging from about 20 to 80.

In some embodiments, the thermal interface material further comprises thermally conductive powder mixed in the thermal interface material.

In some embodiments, the disclosed thermally conductive powder may comprise ceramic powder, for example boron nitride, silicon carbide, aluminum nitride or aluminum oxide.

In some embodiments, the thermally conductive powder has a weight ratio less than or equal to about 50% in the thermal interface material.

In the disclosure, trimellitic anhydride (TMA) and the specific diisocyanate (for example MDI, TODI, NDI or a mixture thereof), dianhydride (for example PMDA, BTDA, ODPA, BPDA or a mixture thereof) and dicarboxylic acid (for example StDA) are adopted to proceed to polymerization reaction with the specific ratios to prepare a thermally conductive resin (PAI or PI) with characteristics of high thermal conductivity and high dielectric insulation.

EXAMPLES

Example 1

The Preparation of the Thermally Conductive Resin (PAI resin) (1)

Under room temperature, a stirrer and heating mantle were shelved on a one-liter four-mouth reactor. 71.98 g of trimellitic anhydride (TMA), 125.00 g of 4,4'-methylenediphenyl diisocyanate (MDI), 7.35 g of 3,3',4,4'-biphenyl tetracarboxylic dianhydride (BPDA) and 26.80 g of 4,4'-stilbenedicarboxylic acid (StDA) were added to the reactor. 693.37 g of NMP solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 1. After the above steps were completed, the resin was kept in a sealed PE bottle.

Example 2

The Preparation of the Thermally Conductive Resin (PAI resin) (2)

Under room temperature, a stirrer and heating mantle were shelved on a one-liter four-mouth reactor. 36.24 g of trimellitic anhydride (TMA), 118.00 g of 4,4'-methylenediphenyl diisocyanate (MDI), 41.62 g of 3,3',4,4'-biphenyl tetracarboxylic dianhydride (BPDA) and 37.95 g of 4,4'-stilbenedicarboxylic acid (StDA) were added to the reactor. 701.41 g of NMP solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 1. After the above steps were completed, the resin was kept in a sealed PE bottle.

Example 3

The Preparation of the Thermally Conductive Resin (PI resin) (3)

Under room temperature, a stirrer and heating mantle were shelved on a one-liter four-mouth reactor. 108.00 g of 4,4'-methylenediphenyl diisocyanate (MDI), 63.49 g of 3,3',4,4'-biphenyl tetracarboxylic dianhydride (BPDA) and 57.89 g of 4,4'-stilbenedicarboxylic acid (StDA) were added to the reactor. 688.12 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PI resin) of this example was prepared. Next, the thermal conductivity value of the resin material was tested and is listed in Table 1. After the above steps were completed, the resin was kept in a sealed PE bottle.

Example 4

The Preparation of the Thermally Conductive Resin (PI resin) (4)

Under room temperature, a stirrer and heating mantle were shelved on a one-liter four-mouth reactor. 110.00 g of 4,4'-methylenediphenyl diisocyanate (MDI), 25.87 g of 3,3',4,4'-biphenyl tetracarboxylic dianhydride (BPDA) and 94.33 g of 4,4'-stilbenedicarboxylic acid (StDA) were added to the reactor. 690.59 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PI resin) of this example was prepared. Next, the thermal conductivity value of the resin material was tested and is listed in Table 1. After the above steps were completed, the resin was kept in a sealed PE bottle.

Example 5

The Preparation of the Thermally Conductive Resin (PI resin) (5)

Under room temperature, a stirrer and heating mantle were shelved on a one-liter four-mouth reactor. 108.00 g of 4,4'-methylenediphenyl diisocyanate (MDI), 31.74 g of 3,3', 4,4'-biphenyl tetracarboxylic dianhydride (BPDA), 33.47 g of 4,4'-oxydiphthalic anhydride (ODPA) and 57.89 g of 4,4'-stilbenedicarboxylic acid (StDA) were added to the reactor. 693.30 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PI resin) of this example was prepared. Next, the thermal conductivity value of the resin material was tested and is listed in Table 1. After the above steps were completed, the resin was kept in a sealed PE bottle.

Example 6

The Preparation of the Thermally Conductive Resin (PI resin) (6)

Under room temperature, a stirrer and heating mantle were shelved on a one-liter four-mouth reactor. 53.50 g of 4,4'-methylenediphenyl diisocyanate (MDI), 56.50 g of 3,3'-dimethylbiphenyl-4,4'-diisocyanate (TODI), 31.45 g of 3,3', 4,4'-biphenyl tetracarboxylic dianhydride (BPDA), 33.16 g of 4,4'-oxydiphthalic anhydride (ODPA) and 57.35 g of 4,4'-stilbenedicarboxylic acid (StDA) were added to the reactor. 695.87 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PI resin) of this example was prepared. Next, the thermal conductivity value of the resin material was tested and is listed in Table 1. After the above steps were completed, the resin was kept in a sealed PE bottle.

TABLE 1

| Examples | 1 | 2 | 3 | 4 | 5 | 6 |
|---|---|---|---|---|---|---|
| Trimellitic anhydride (TMA) | + | + | − | − | − | − |
| Diisocyanate | MDI | MDI | MDI | MDI | MDI | MDI TODI |
| Dianhydride | BPDA | BPDA | BPDA | BPDA | BPDA ODPA | BPDA ODPA |
| Dicarboxylic acid | StDA | StDA | StDA | StDA | StDA | StDA |
| Thermal conductivity value (W/mK) | 0.35 | 0.41 | 0.42 | 0.45 | 0.41 | 0.36 |
| Molar ratio (m:n:o) | 75:5:20 | 40:30:30 | 0:50:50 | 0:20:80 | 0:50:50 | 0:50:50 |

Example 7

The Preparation of the Thermally Conductive Resin (PI resin) (7)

Under room temperature, a stirrer and heating mantle were shelved on a one-liter four-mouth reactor. 56.50 g of 4,4'-methylenediphenyl diisocyanate (MDI), 47.45 g of 1,5-naphthalene diisocyanate (NDI), 66.43 g of 3,3',4,4'-biphenyl tetracarboxylic dianhydride (BPDA) and 60.57 g of 4,4'-stilbenedicarboxylic acid (StDA) were added to the reactor. 692.84 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PI resin) of this example was prepared. Next, the thermal conductivity value of the resin material was tested and is listed in Table 2. After the above steps were completed, the resin was kept in a sealed PE bottle.

Example 8

The Preparation of the Thermally Conductive Resin (PAI resin) (8)

Under room temperature, a stirrer and heating mantle were shelved on a one-liter four-mouth reactor. 35.62 g of trimellitic anhydride (TMA), 116.00 g of 4,4'-methylenediphenyl diisocyanate (MDI), 20.46 g of 3,3',4,4'-biphenyl tetracarboxylic dianhydride (BPDA), 22.40 g of 3,3',4,4'-benzophenone tetracarboxylic dianhydride (BTDA) and 37.30 g of 4,4'-stilbenedicarboxylic acid (StDA) were added to the reactor. 695.37 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 2. After the above steps were completed, the resin was kept in a sealed PE bottle.

Example 9

The Preparation of the Thermally Conductive Resin (PAI resin) (9)

Under room temperature, a stirrer and heating mantle were shelved on a one-liter four-mouth reactor. 36.54 g of trimellitic anhydride (TMA), 119.00 g of 4,4'-methylenediphenyl diisocyanate (MDI), 20.99 g of 3,3',4,4'-biphenyl tetracarboxylic dianhydride (BPDA), 15.56 g of pyromellitic dianhydride (PMDA) and 38.27 g of 4,4'-stilbenedicarboxylic acid (StDA) were added to the reactor. 691.07 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 2. After the above steps were completed, the resin was kept in a sealed PE bottle.

Example 10

The Preparation of the Thermally Conductive Resin (PAI resin) (10)

Under room temperature, a stirrer and heating mantle were shelved on a one-liter four-mouth reactor. 35.62 g of trimellitic anhydride (TMA), 116.00 g of 4,4'-methylenediphenyl diisocyanate (MDI), 20.46 g of 3,3',4,4'-biphenyl tetracarboxylic dianhydride (BPDA), 21.57 g of 4,4'-oxydiphthalic anhydride (ODPA) and 37.30 g of 4,4'-stilbenedicarboxylic acid (StDA) were added to the reactor. 692.86 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 2. After the above steps were completed, the resin was kept in a sealed PE bottle.

Example 11

The Preparation of the Thermally Conductive Resin (PAI resin) (11)

Under room temperature, a stirrer and heating mantle were shelved on a one-liter four-mouth reactor. 26.03 g of trimellitic anhydride (TMA), 56.50 g of 4,4'-methylenediphenyl diisocyanate (MDI), 59.67 g of 3,3'-dimethylbiphenyl-4,4'-diisocyanate (TODI), 39.86 g of 3,3',4,4'-biphenyl tetracarboxylic dianhydride (BPDA) and 48.45 g of 4,4'-stilbenedicarboxylic acid (StDA) were added to the reactor. 691.50 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 2. After the above steps were completed, the resin was kept in a sealed PE bottle.

Example 12

The Preparation of the Thermally Conductive Resin (PAI resin) (12)

Under room temperature, a stirrer and heating mantle were shelved on a one-liter four-mouth reactor. 27.87 g of trimellitic anhydride (TMA), 60.50 g of 4,4'-methylenediphenyl diisocyanate (MDI), 50.81 g of 1,5-naphthalene diisocyanate (NDI), 14.23 g of 3,3',4,4'-biphenyl tetracarboxylic dianhydride (BPDA) and 77.82 g of 4,4'-stilbenedi-carboxylic acid (StDA) were added to the reactor. 693.70 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 2. After the above steps were completed, the resin was kept in a sealed PE bottle.

Example 13

The Preparation of the Thermally Conductive Resin (PAI resin) (13)

Under room temperature, a stirrer and heating mantle were shelved on a one-liter four-mouth reactor. 27.06 g of trimellitic anhydride (TMA), 47.00 g of 4,4'-methylenediphenyl diisocyanate (MDI), 29.61 g of 1,5-naphthalene diisocyanate (NDI), 37.23 g of 3,3'-dimethylbiphenyl-4,4'-diisocyanate (TODI), 13.81 g of 3,3',4,4'-biphenyl tetracarboxylic dianhydride (BPDA) and 75.57 g of 4,4'-stilbenedicarboxylic acid (StDA) were added to the reactor. 690.85 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 2. After the above steps were completed, the resin was kept in a sealed PE bottle.

TABLE 2

| Examples | 7 | 8 | 9 | 10 | 11 | 12 | 13 |
|---|---|---|---|---|---|---|---|
| Trimellitic anhydride (TMA) | − | + | + | + | + | + | + |
| Diisocyanate | MDI NDI | MDI | MDI | MDI | MDI TODI | MDI NDI | MDI NDI TODI |
| Dianhydride | BPDA | BPDA BTDA | BPDA PMDA | BPDA ODPA | BPDA | BPDA | BPDA |
| Dicarboxylic acid | StDA | StDA | StDA | StDA | StDA | StDA | StDA |
| Thermal conductivity value (W/mK) | 0.42 | 0.32 | 0.36 | 0.31 | 0.37 | 0.45 | 0.41 |
| Molar ratio (m:n:o) | 0:50:50 | 40:30:30 | 40:30:30 | 40:30:30 | 30:30:40 | 30:10:60 | 30:10:60 |

Example 14

The Preparation of the Thermally Conductive Resin (PAI resin) (14)

Under room temperature, a stirrer and heating mantle were shelved on a one-liter four-mouth reactor. 27.42 g of trimellitic anhydride (TMA), 50.00 g of 1,5-naphthalene diisocyanate (NDI), 62.87 g of 3,3'-dimethylbiphenyl-4,4'-diisocyanate (TODI), 14.00 g of 3,3',4,4'-biphenyl tetracarboxylic dianhydride (BPDA) and 76.58 g of 4,4'-stilbenedicarboxylic acid (StDA) were added to the reactor. 692.59 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 3. After the above steps were completed, the resin was kept in a sealed PE bottle.

Example 15

The Preparation of the Thermally Conductive Resin (PAI resin) (15)

Under room temperature, a stirrer and heating mantle were shelved on a one-liter four-mouth reactor. 4.49 g of trimellitic anhydride (TMA), 58.50 g of 4,4'-methylenediphenyl diisocyanate (MDI), 49.13 g of 1,5-naphthalene diisocyanate (NDI), 10.32 g of 3,3',4,4'-biphenyl tetracarboxylic dianhydride (BPDA), 7.65 g of pyromellitic dianhydride (PMDA) and 100.34 g of 4,4'-stilbenedicarboxylic acid (StDA) were added to the reactor. 691.28 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 3. After the above steps were completed, the resin was kept in a sealed PE bottle.

Example 16

The Preparation of the Thermally Conductive Resin (PAI resin) (16)

Under room temperature, a stirrer and heating mantle were shelved on a one-liter four-mouth reactor. 4.43 g of trimellitic anhydride (TMA), 48.50 g of 1,5-naphthalene diisocyanate (NDI), 60.98 g of 3,3'-dimethylbiphenyl-4,4'-diisocyanate (TODI), 10.18 g of 3,3',4,4'-biphenyl tetracarboxylic dianhydride (BPDA), 7.55 g of pyromellitic dianhydride (PMDA) and 99.04 g of 4,4'-stilbenedicarboxylic acid (StDA) were added to the reactor. 692.06 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this example was prepared. Next, the thermal conductivity value of the resin material was tested and is listed in Table 3. After the above steps were completed, the resin was kept in a sealed PE bottle.

TABLE 3

| Examples | 14 | 15 | 16 |
|---|---|---|---|
| Trimellitic anhydride (TMA) | + | + | + |
| Diisocyanate | NDI | MDI | NDI |
|  | TODI | NDI | TODI |
| Dianhydride | BPDA | BPDA | BPDA |
|  |  | PMDA | PMDA |
| Dicarboxylic acid | StDA | StDA | StDA |
| Thermal conductivity value (W/mK) | 0.42 | 0.46 | 0.44 |
| Molar ratio (m:n:o) | 30:10:60 | 5:15:80 | 5:15:80 |

Comparative Example 1

The Preparation of Conventional Thermally Conductive Resin (PAI resin)

Under room temperature, a stirrer and heating mantle were shelved on a one-liter four-mouth reactor. 100.57 g of trimellitic anhydride (TMA) and 131.00 g of 4,4'-methylenediphenyl diisocyanate (MDI) were added to the reactor. 263.04 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this comparative example was prepared. Next, the thermal conductivity value of the resin material was tested and is listed in Table 4. After the above steps were completed, the resin was kept in a sealed PE bottle.

Comparative Example 2

The Preparation of Conventional Thermally Conductive Resin (PAI resin)

Under room temperature, a stirrer and heating mantle were shelved on a one-liter four-mouth reactor. 94.82 g of trimellitic anhydride (TMA), 130.00 g of 4,4'-methylenediphenyl diisocyanate (MDI) and 6.97 g of 4,4'-stilbenedicarboxylic acid (StDA) were added to the reactor. 695.35 g of n-methylpyrrolidinone (NMP) solvent was then added to the reactor to proceed to dissolution reaction with uniform stirring. The reaction temperature was raised to 80° C. for one-hour reaction, and then raised to 120° C. for two-hour reaction. Next, the reaction temperature was continuously raised to 170° C. for two-hour reaction. After the reaction was completed, the reactor was cooled down to room temperature. A thermally conductive resin (PAI resin) of this comparative example was thus prepared. Next, the thermal conductivity value of the resin material was tested and is listed in Table 4. After the above steps were completed, the resin was kept in a sealed PE bottle.

TABLE 4

| Comparative Example | 1 | 2 |
|---|---|---|
| Trimellitic anhydride (TMA) | + | + |
| Diisocyanate | MDI | MDI |
| Dianhydride | − | − |
| Dicarboxylic acid | − | StDA |

TABLE 4-continued

| Comparative Example | 1 | 2 |
|---|---|---|
| Thermal conductivity value (W/mK) | 0.18 | 0.24 |
| Molar ratio (m:n:o) | 100:0:0 | 95:0:5 |

Example 17

The Preparation of the Thermal Interface Material (1) (with 50% thermally conductive powder of aluminum oxide)

The thermally conductive resin (PI resin) prepared by Example 4 was mixed with 50 wt % of thermally conductive powder of aluminum oxide to form a thermal interface material of this example. The thermal conductivity value and volume resistivity of the thermal interface material were then tested and are listed in Table 5.

Example 18

The Preparation of the Thermal Interface Material (2) (with 50% thermally conductive powder of aluminum oxide)

The thermally conductive resin (PAI resin) prepared by Example 15 was mixed with 50 wt % of thermally conductive powder of aluminum oxide to form a thermal interface material of this example. The thermal conductivity value and volume resistivity of the thermal interface material were then tested and are listed in Table 5.

Comparative Example 3

The Preparation of Conventional Thermal Interface Material (with 85% Thermally Conductive Powder of Aluminum Oxide)

The thermally conductive resin (PAI resin) prepared by Comparative Example 1 was mixed with 85 wt % of thermally conductive powder of aluminum oxide to form a thermal interface material of this example. The thermal conductivity value and volume resistivity of the thermal interface material were then tested and are listed in Table 5.

TABLE 5

| | Example 17 | Example 18 | Com. Example 3 |
|---|---|---|---|
| Thermally conductive resin | PI | PAI | PAI |
| Thermally conductive powder | Aluminum oxide (50 wt %) | Aluminum oxide (50 wt %) | Aluminum oxide (85 wt %) |
| Thermal conductivity value (W/mK) | 4.6 | 5.0 | 3.2 |
| Volume resistivity (Ω-cm) | $10^{13}$ | $10^{13}$ | $10^{11}$ |
| Breakdown voltage (V) | 1.5 | 1.5 | 1.1 |

In the disclosure, trimellitic anhydride (TMA) and the specific diisocyanate (for example MDI, TODI, NDI or a mixture thereof), dianhydride (for example PMDA, BTDA, ODPA, BPDA or a mixture thereof) and dicarboxylic acid (for example StDA) are adopted to proceed to polymerization reaction with the specific ratios to prepare a thermally conductive resin (PAI or PI) with characteristics of high thermal conductivity and high dielectric insulation. The thermal conductivity value of the present thermally conductive resin is higher than that of conventional thermally conductive resin about 1.3 to 2.3 times. Additionally, when a thermal interface material is further prepared, merely a small amount (about 50 wt % below) of thermally conductive powder (for example ceramic powder) is added in the thermally conductive resin, and the thermal interface material with characteristic of high thermal conductivity is thus obtained due to the present thermally conductive resin with superior characteristic of thermal conductivity. In a conventional thermal interface material, however, even though more than 80 wt % of thermally conductive powder is added, it still fails to reach the thermal conductivity value of the present thermally conductive resin.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A thermally conductive resin, represented by formula (I):

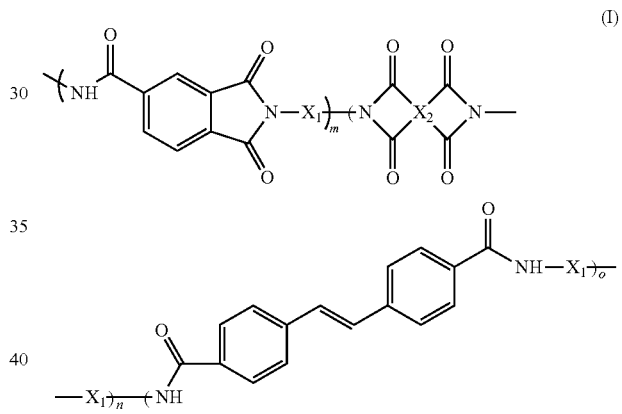

wherein $X_1$ is

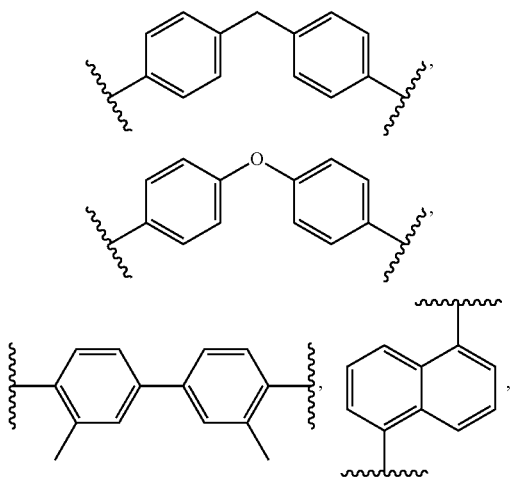

-continued

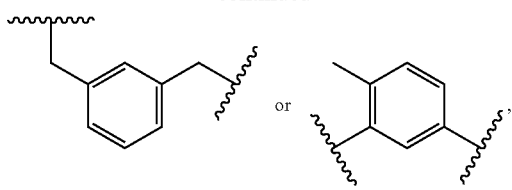
or $X_2$ is

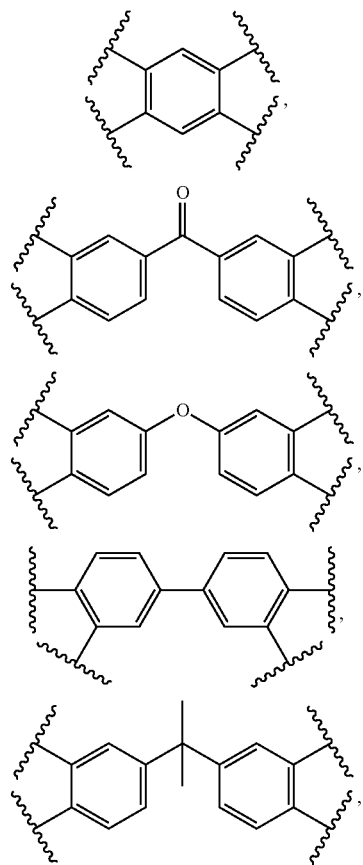

-continued

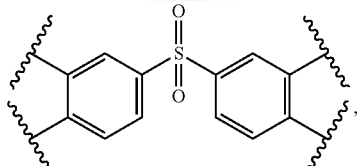

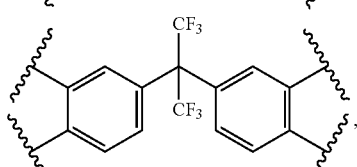

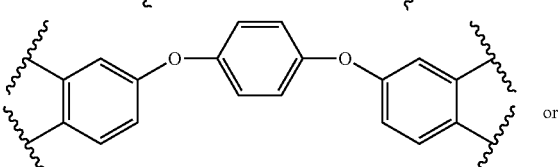
or

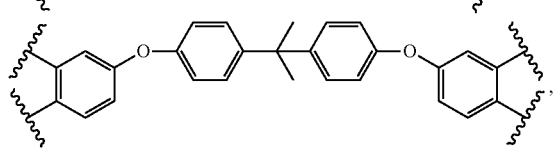

m is an integer ranging from 5 to 30,
n is an integer ranging from 5 to 15, and
o is an integer ranging from 40 to 80, wherein m:n:o=5-30:5-15:40-80.

2. A thermal interface material comprising a thermally conductive resin as claimed in claim 1.

3. The thermal interface material as claimed in claim 2, further comprising thermally conductive powder mixed in the thermal interface material.

4. The thermal interface material as claimed in claim 3, wherein the thermally conductive powder comprises ceramic powder.

5. The thermal interface material as claimed in claim 3, wherein the thermally conductive powder comprises boron nitride, silicon carbide, aluminum nitride or aluminum oxide.

6. The thermal interface material as claimed in claim 3, wherein the thermally conductive powder has a weight ratio less than or equal to 50% in the thermal interface material.

* * * * *